United States Patent
Baba et al.

(10) Patent No.: US 9,202,130 B2
(45) Date of Patent: Dec. 1, 2015

(54) IMAGE PROCESSING APPARATUS AND IMAGE PROCESSING METHOD

(71) Applicant: FUJITSU LIMITED, Kawasaki-shi, Kanagawa (JP)

(72) Inventors: Takayuki Baba, Kawasaki (JP); Shugo Nakamura, Yokohama (JP); Masaki Ishihara, Kawasaki (JP); Masahiko Sugimura, Meguro (JP); Susumu Endo, Kawasaki (JP); Yusuke Uehara, Kawasaki (JP); Daiki Masumoto, Kawasaki (JP); Hirohisa Naito, Fuchu (JP); Akira Miyazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 153 days.

(21) Appl. No.: 13/848,086

(22) Filed: Mar. 21, 2013

(65) Prior Publication Data

US 2013/0308867 A1 Nov. 21, 2013

(30) Foreign Application Priority Data

May 17, 2012 (JP) ................................. 2012-113646

(51) Int. Cl.
G06K 9/46 (2006.01)
G06K 9/68 (2006.01)

(52) U.S. Cl.
CPC ........ *G06K 9/46* (2013.01); *G06K 9/469* (2013.01); *G06K 9/6892* (2013.01)

(58) Field of Classification Search
None
See application file for complete search history.

(56) References Cited

U.S. PATENT DOCUMENTS

| | | | |
|---|---|---|---|
| 6,502,105 B1 * | 12/2002 | Yan et al. | |
| 6,778,980 B1 * | 8/2004 | Madan et al. | |
| 7,587,064 B2 * | 9/2009 | Owechko | G06K 9/469 382/103 |
| 2010/0111396 A1 * | 5/2010 | Boucheron | 382/133 |
| 2010/0220929 A1 * | 9/2010 | Misawa et al. | 382/190 |
| 2011/0211758 A1 * | 9/2011 | Joshi et al. | 382/167 |
| 2012/0148093 A1 * | 6/2012 | Sharma | 382/103 |

FOREIGN PATENT DOCUMENTS

| | | |
|---|---|---|
| JP | 6-168331 | 6/1994 |
| JP | 2009-260693 | 11/2009 |

OTHER PUBLICATIONS

Susumu Endo et al., "MIRACLES: Multimedia Information Retrieval, Classification, and Exploration System", Information Technology Media Laboratories, Fujitsu Laboratories Ltd., IEEE, 2002, pp. 349-352.

* cited by examiner

*Primary Examiner* — David F Dunphy
(74) *Attorney, Agent, or Firm* — Staas & Halsey LLP

(57) ABSTRACT

An image processing apparatus includes: a storage configured to store, for a plurality of areas in a target image, attributes and patterns associated with the attributes, each the attributes being assigned to each the plurality of areas, and each the pattern being created from areas having an identical attribute among the attributes; and a processor configured to: obtain an area that is specified in the target image and an attribute that is assigned to the specified area, search the storage for a pattern based on similarity between the pattern and a pattern created from a certain number of areas having the assigned attribute; and search for an area in the target image based on similarity between the area and the certain number of areas in accordance with the searched pattern.

17 Claims, 19 Drawing Sheets

FIG. 12

| ATTRIBUTE | GRAPH OF PRECEDING OPERATION RESULT ||
|---|---|---|
| | PATTERN 1 | PATTERN 2 |
| PYLON | ◯—◯—◯—◯ | ◯—◯⟋◯ |
| | NUMBER OF HITS = 4 | NUMBER OF HITS = 1 |

IMAGE PROCESSING APPARATUS AND IMAGE PROCESSING METHOD

CROSS-REFERENCE TO RELATED APPLICATION

This application is based upon and claims the benefit of priority from the prior Japanese Patent Application No. 2012-113646 filed on May 17, 2012, the entire contents of which are incorporated herein by reference.

FIELD

The embodiments herein are related to an image processing apparatus and an image processing method.

BACKGROUND

Recently, generic object recognition by which the name of an object in an image is automatically recognized has been actively studied. For example, by the generic object recognition, efficient image search may be performed as long as an object name is automatically assigned to an image as meta-data.

(1) Creation of an Image Corpus

A basic procedure of automatically assigning meta-data by the generic object recognition is described below.

In the generic object recognition, a large number of images to which a correct object name is assigned beforehand are prepared for each object name. Hereinafter, an image with a correct object name is referred to as an image corpus (training image).

(2) Machine Learning

Relationships between images and correct object names may be automatically obtained by machine learning.

(3) Automatic Assignment of Meta-Data

Meta-data is automatically assigned to an unknown image using the relationship that is obtained by the machine learning of (2).

In the above-described procedure, correct meta-data is assigned to an image manually in order to create the image corpus of (1), so that it takes enormous effort. The meta-data is, for example, an object name. Therefore, it is desirable that the manual assigning operation is streamlined.

Therefore, a case is described below in which correct meta-data is assigned manually. For example, it is assumed that, for a satellite or aerial photo that is displayed on a screen, an area of a pylon is specified manually by a person who performs input, and a "pylon" is input to the field of an object name. In the manual assigning operation, the following two procedures are performed.

(A) To specify an area of an object by a person who performs input.

(B) To input a correct name of the specified object by the person who performs input.

In the end, when the person who performs input gives saving instruction, a pair of a partial image of the specified area and the correct object name is saved as an image corpus.

On the other hand, as a known technology by which meta-data is assigned, for example, there is a technology for associating, by a management server, meta-data of material contents that are created by an editing terminal with corresponding accuracy, and storing the associated meta-data and accuracy in a database (DB).

Image corpus construction operation may be streamlined by performing similar area search. For example, there is a technology for automatically searching for an area the appearance (image feature amount) of which is similar to an area specified manually. As the image feature amount, a feature amount of color, shape, and the like are employed.

As a technology by which similar area search is streamlined, there is a technology of moving a reference image, calculating a matching degree of a captured image and a reference image when matching of the two images is performed, detecting a certain primary matching candidate point, and performing secondary matching in descending order of matching degree.

Japanese Laid-open Patent Publication No. 2009-260693 and Japanese Laid-open Patent Publication No. 6-168331 are examples of the related art.

Susumu Endo, Shuichi Shiitani, Yusuke Uehara, Daiki Masumoto, and Shigemi Nagata: MIRACLES: Multimedia Information Retrieval, Classification, and Exploration System, ICME2002, proceedings of ICME2002 (2002) is also an example of the related art.

SUMMARY

According to an aspect of the invention, an image processing apparatus includes: a storage configured to store, for a plurality of areas in a target image, attributes and patterns associated with the attributes, each the attributes being assigned to each the plurality of areas, and each the pattern being created from areas having an identical attribute among the attributes; and a processor configured to: obtain an area that is specified in the target image and an attribute that is assigned to the specified area, search the storage for a pattern based on similarity between the pattern and a pattern created from a certain number of areas having the assigned attribute; and search for an area in the target image based on similarity between the area and the certain number of areas in accordance with the searched pattern.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a diagram illustrating a priority level calculation process based on the number of hits;

DESCRIPTION OF THE EMBODIMENTS

Figure 1:
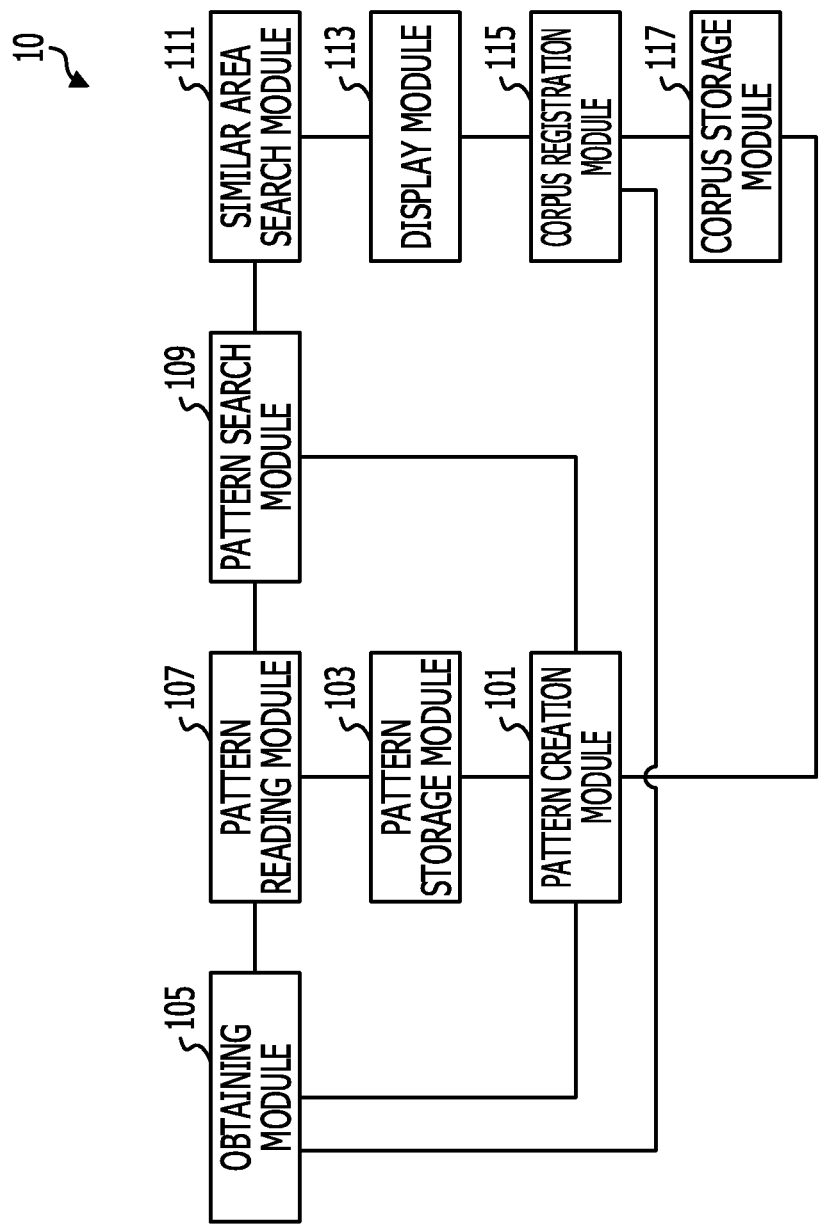
FIG. 1 is block diagram illustrating an example of a configuration of an image processing apparatus according to a first embodiment.

Hereinafter, embodiments will be described with reference to the drawings.

While inventing the present embodiments, observations were made regarding a related art. Such observations include the following, for example.

In the related art, regarding an image corpus, a certain number M or more cases are prepared for one target. The certain number M is, for example, 1000. Therefore, when a similar area is automatically searched for, computation time becomes enormous because the searching is continued until the certain number or more of similar areas are found, an image feature amount is extracted in each area of the image, and similarity calculation using the image feature amount is performed.

In addition, even when the similarity search is streamlined in the above-described related art, the search is performed in each area of an image to detect a primary matching candidate point, so that the similarity search may not be performed efficiently in the creation of an image corpus.

First, in search of similar areas of the embodiments discussed herein, a search range may be limited in order to perform the search efficiently while suppressing a calculation amount. For example, a distance from a manually input area may be limited to a range that is less than a threshold value, however, a similar area may not exist in a close range.

For example, when an object to which meta-data is assigned is a "pylon" for power transmission or the like, it is highly probable that a similar pylon does not exist in a close range because another "pylon" exists at a distance to some extent.

On the other hand, there is an object that has a certain pattern in objects to which meta-data is assigned. For example, in a case of a "pylon" for power transmission or the like over a land, pylons are lined up in a row at relatively regular intervals, and located away from each other. Therefore, in each embodiment that is described below, search for a similar range is performed effectively by predicting a pattern of the target object after meta-data is assigned to a certain number of objects and filtering search ranges on the basis of the predicted pattern. In each of the embodiments, the following two conditions are satisfied.

First Condition

A case is considered in which, in a stage of creating an image corpus, as a result of a preceding operation, a correct object name (meta-data) is manually assigned to an area including a target (object) in an image. In that case, one or more patterns including areas exist for each object name, and the number of areas for each object name is less than "M".

Here, each pattern includes three or more areas, distances between areas are a threshold value or less. For the details of a pattern, see automatic conversion of the pattern to a graph, which is described later. As an example of a pattern, for example, there is a pattern that includes areas of four "pylons", and a pattern that includes areas of three "pylons".

Second Condition

For a target image for which an image corpus is created, a state in which meta-data is manually assigned to two or more areas is regarded as a target to be processed in the embodiments. The process according to the embodiments starts when two or more areas in which a pattern appears are input, because one area alone does not represent a pattern. The target image is an image for which an image corpus is being created.

The state in which two or more areas are input is a state in which one or more lines exist in a graph that is described later. If a state in which mere one area is input is regarded as a target to be processed, it is difficult for a priority level calculation module that is described later in a second embodiment to determine a coordinate position of each vertex of a matching result, so that the state in which mere one area is input is not regarded as a target to be processed.

First Embodiment

Configuration

FIG. 1 is a block diagram illustrating an example of a configuration of an image processing apparatus 10 according to a first embodiment. The image processing apparatus 10 illustrated in FIG. 1 is an apparatus that supports creation of an image corpus. The image processing apparatus 10 illustrated in FIG. 1 includes a pattern creation module 101, a pattern storage module 103, an obtaining module 105, a pattern reading module 107, a pattern search module 109, a similar area search module 111, a display module 113, a corpus registration module 115, and a corpus storage module 117.

The pattern creation module 101 creates a distribution pattern of areas having an identical attribute, out of areas to which attributes are assigned by an author of an image corpus, from the corpus storage module 117, and writes the created distribution pattern to the pattern storage module 103. The attribute is, for example, an object name, etc., and also referred to as meta-data. The creation of a distribution pattern is described later.

In addition, the pattern creation module 101 creates a distribution pattern of areas having an identical attribute and outputs the created distribution pattern to the pattern search module 109 when areas, of a target image which is input from the obtaining module 105, to which an attribute has been assigned are a certain number of areas (for example, two).

The pattern storage module 103 stores the distribution pattern that is written from the pattern creation module 101. For example, the pattern storage module 103 associates, for a plurality of areas in each image, a pattern that is created from the areas having an identical attribute that is assigned to the plurality of areas, with the attribute, and store the associated pattern and attribute.

The obtaining module 105 obtains an area that is specified by the author for a target image of image corpus creation, and an attribute that is assigned to the specified area. The obtaining module 105 obtains the area that is specified by the author and the attribute that is assigned by input using an image corpus creation graphical user interface (GUI), etc. The obtaining module 105 outputs the obtained area and attribute to the pattern creation module 101, and outputs the attribute to the pattern reading module 107.

In addition, after a similar area that is described later is displayed, when the obtaining module 105 obtains a registration instruction to register the similar area, to an image corpus, from the author, the obtaining module 105 reports the registration instruction to the corpus registration module 115.

The pattern reading module 107 obtains the attribute from the obtaining module 105, and reads a distribution pattern having an attribute identical to the obtained attribute from the pattern storage module 103. The pattern reading module 107 outputs the read distribution pattern to the pattern search module 109. The pattern reading module 107 may be included in the pattern search module 109 and may not be configured separately from the pattern search module 109.

The pattern search module 109 searches for a pattern similar to the distribution pattern in the target image, which is created in the pattern creation module 101, from the distribution patterns that are read in the pattern reading module 107.

The pattern search module 109 may search for a pattern that is a distribution pattern that corresponds to the already assigned attribute that is obtained from the obtaining module 105, and that is similar to a distribution pattern that is created from the certain number (for example, two) of areas having the identical attribute, from the pattern storage module 103. The distribution pattern that corresponds to an attribute is a distribution pattern having an identical attribute.

The pattern search module 109 performs partial matching on the distribution pattern of the target image to obtain a distribution pattern that is determined to be similar to the distribution pattern as a search result, and outputs the search result to the similar area search module 111.

The similar area search module 111 searches for an area similar to the certain number of areas in the target image on the basis of the one or more distribution patterns that are obtained from the pattern search module 109. For example, the similar area search module 111 regards an area other than the certain number of areas in the target image, out of the distribution patterns of the search result, as a similar area candidate.

The similar area search module 111 obtains a distance of image feature amount between a similar area candidate an area in the target image, and determines that the areas are similar when the distance is less than a threshold value. Examples of the image feature amount include a pixel value, an edge amount, and color histogram. The similar area search module 111 outputs the similar area candidate that is determined to be similar to the area in the target image, to the display module 113, as a similar area of the search result.

The display module 113 displays on the image the similar area that is obtained from the similar area search module 111 in a format that is different from that of the certain number of areas in the target image. In addition, the display module 113 may display a degree of similarity that has been used for the similarity determination, in the vicinity of the similar area.

The corpus registration module 115 registers the similar area to the corpus storage module 117, as an area having an attribute identical to the certain number of areas when a registration instruction from the author is received from the obtaining module 105, for the similar area that is displayed in the display module 113.

The corpus storage module 117 stores an image corpus that is registered in the corpus registration module 115. The image corpus stores at least an area in an image and an attribute that is assigned to the area. In addition, for example, when the certain number of image corpuses are stored in the corpus storage module 117, the pattern creation module 101 creates a distribution pattern of area having an identical attribute.

As described above, search for a similar range may be performed effectively by predicting a pattern of objects after attributes are assigned to the certain number of objects and filtering search ranges on the basis of the predicted pattern. A specific example of each process is described below.

Pattern Creation Process

Figure 2:
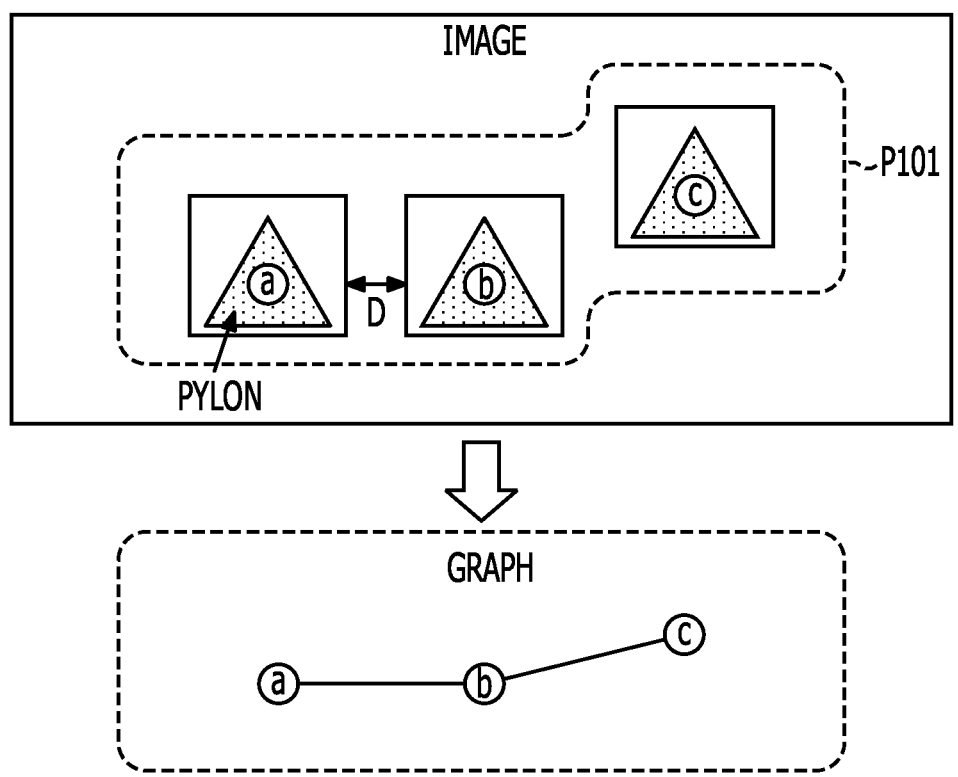
FIG. 2 is a diagram illustrating a method of automatically converting a distribution pattern into a graph.

First, a pattern creation process is described. FIG. 2 is a diagram illustrating a method of automatically converting a distribution pattern into a graph. As illustrated in FIG. 2, the pattern creation module 101 regards a gravity point of each area as a vertex, and creates a graph having a line that is a distance between vertices and is less than a threshold value.

The pattern creation module 101 regards, for example, a gravity point coordinate of each area of a distribution pattern P101 that is illustrated in FIG. 2, as a vertex, and converts the pattern P101 into a graph that is obtained by connecting the vertices through a line, when a distance D between the corresponding two areas is a threshold value T or less.

In the example of FIG. 2, an example is described in which an attribute is "pylon" and three areas are specified manually. First, the pattern creation module 101 obtains gravity point coordinates of areas, and sets the gravity point coordinates as vertices a, b, and c, respectively. Next, when a distance D between areas is the threshold value T or less, the pattern creation module 101 creates a line of a graph. The threshold value T may be specified for each object name beforehand. For example, in the case of a pylon, the threshold value T is set as a length of an average distance between pylons.

In addition, the pattern creation module 101 may perform conversion to a graph with a weight instead of automatic conversion to a graph. For example, the pattern creation module 101 sets an "angle between lines connected to vertices" as a weight of the vertex and sets a "distance between vertices" as a weight of a line. In addition, the pattern creation module 101 may set an "image feature amount corresponding to a vertex" in an area (multidimensional vector) as a weight of the vertex.

As the image feature amount, for example, there is an image feature amount of color or shape (see, Susumu Endo, Shuichi Shiitani, Yusuke Uehara, Daiki Masumoto, and Shigemi Nagata: MIRACLES: Multimedia Information Retrieval, Classification, and Exploration System, ICME2002, proceedings of ICME2002 (2002)). A graph in which a weight of a vertex and a weight of a line are not set may be treated as a graph with a weight, in which all weights of vertices are set to 1, a weight of a line is set to 1 when a line exists, and a weight of a line is set to 0 when a line does not exist. Therefore, in a detailed process of the pattern search module 109, which is described later, matching of graphs with a weight is described as an example.

It is assumed that, for the ease of explanation, scales of images to which an attribute (correct answer) is assigned manually are standardized in the embodiments. On the other hand, when scales of images to which an attribute is assigned manually are not standardized, the pattern creation module 101 may obtain scale information of an image to which an attribute is assigned manually and create a graph by scaling the image in accordance with a scale that is defined beforehand, on a case-by-case basis.

Example of a Distribution Pattern

Figure 3:
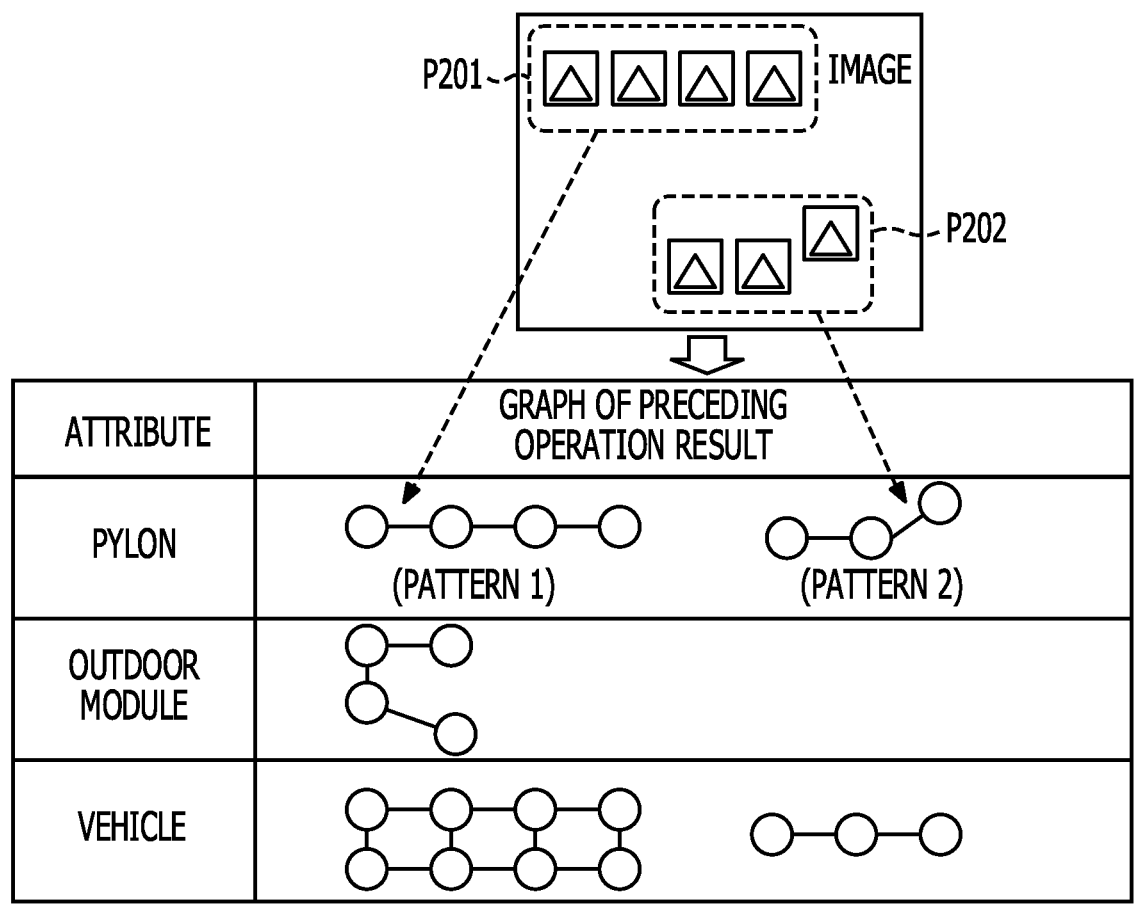
FIG. 3 is a diagram illustrating an example of a distribution pattern.

The pattern creation module 101 stores, for each attribute (object name), a created distribution pattern in the pattern storage module 103. FIG. 3 illustrates an example of a distribution pattern. On a target image that is illustrated in FIG. 3, there are seven pylons obtained by specifying areas manually. In this case, the pattern creation module 101 creates one graph by setting a distribution pattern P201 of adjacent four pylons as a pattern 1. In addition, the pattern creation module 101 creates another graph by setting a distribution pattern P202 of adjacent three pylons as a pattern 2.

As illustrated in FIG. 3, one or more distribution patterns are stored in the pattern storage module 103, for each attribute. In the example of FIG. 3, one distribution pattern is stored for an attribute "outdoor module", and two distribution patterns are stored for an attribute "vehicle". The length of a distance (line) between areas in a distribution pattern may not correspond to an actual distance between the areas.

Obtaining Process

A process of obtaining a specified area from a target image and an attribute is described below. The obtaining module 105 accepts specification of areas (two or more areas) of an object on a target image by the author and input of an object name (attribute) of the specified object.

Figure 4:
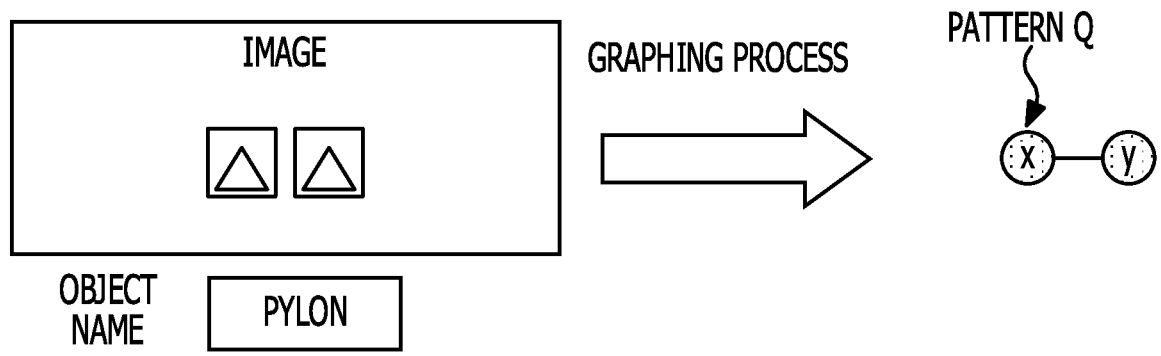
FIG. 4 is a diagram illustrating an example in which a pattern of a target image is graphed.

FIG. 4 is a diagram illustrating an example in which a pattern of a target image is graphed. In the example of FIG. 4, the obtaining module 105 obtains two areas indicated by the rectangles and a "pylon" that is input as an object name. The obtaining module 105 outputs the areas to the pattern creation module 101. The pattern creation module 101 creates a distribution pattern on the basis of the obtained area.

In the example of FIG. 4, a graph that indicates the distribution pattern that is created from the target image in the pattern creation module 101 is represented as a pattern Q or a graph Q. The graph Q includes two vertices "x" and "y". The created distribution pattern (for example, graph Q) is output to the pattern search module 109.

Reading Process

A process of reading a distribution pattern is described below. The pattern reading module 107 reads a distribution pattern having an attribute identical to an attribute (object name) that is obtained from the obtaining module 105, from the pattern storage module 103.

Figure 5:
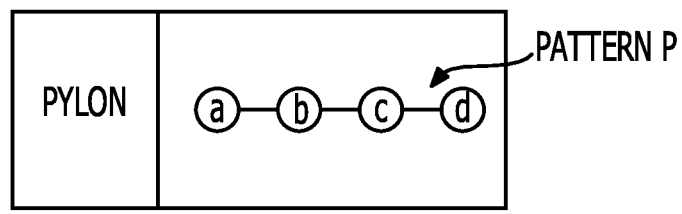
FIG. 5 is a diagram illustrating an example of a distribution pattern that corresponds to a "pylon" as an attribute.

FIG. 5 is a diagram illustrating an example of a distribution pattern that corresponds to an attribute "pylon". In the example of FIG. 5, for the ease of explanation, it is assumed that there is mere one distribution pattern that corresponds to the attribute "pylon" in the pattern storage module 103.

In the example of FIG. 5, the distribution pattern of the attribute "pylon" is represented by a pattern P, and the pattern P is a graph including four vertices "a", "b", "c", and "d". The pattern P is also referred to as a graph P. The pattern reading module 107 outputs the read pattern P to the pattern search module 109. The pattern reading module 107 may be included in the pattern search module 109 as a function of the pattern search module 109.

Search Process

A process of searching for a graph similar to a graph Q from a graph P is described below. First, the pattern search module 109 sets, as a query, a graph Q of a distribution pattern of a target image, which is created in the pattern creation module 101. The pattern search module 109 searches for a distribution pattern of a graph that includes a similar correspondence relationship of a vertex and a line to that of the query, from a graph P of a distribution pattern of a preceding operation result, which is read in the pattern reading module 107.

Here, as described above, in the search of a distribution pattern, matching of graphs with a weight is performed, and a matching method for a graph with a weight is used. Details of the matching method for a graph with a weight are discussed in, for example, Japanese Laid-open Patent Publication No. 2007-287145.

In the matching method for a graph with a weight, a correspondence relationship of vertices or lines that satisfies a limiting condition and minimizes an evaluation function is obtained, thereby causing a problem of combinatorial optimization. Examples of the limiting condition and the evaluation function are described below. The evaluation function is "$E = w\_1 \times J + w\_2 \times K$" ... equation (1), where "$w\_1$" and "$w\_2$" are constants (for example, $w\_1=1$ and $w\_2=2$), "J" is a distance between weighs of vertices that are allocated between the graph P and the graph Q, "K" is a distance between weights of lines that are allocated between the graph P and the graph Q, and the limiting condition is to perform allocation of each vertex of the graph Q to a vertex of the graph P without overlapping.

As the solution to the problem of combinatorial optimization in the matching method of a graph with a weight, there is an exhaustive search method in which all combinations are searched for, and allocation where the limiting condition is satisfied and the evaluation function becomes minimum is obtained.

If it is difficult to perform the exhaustive search because the sizes of graphs are large, the pattern search module 109 may approximately search for, for example, allocation in which the limiting condition is satisfied and the evaluation function become minimum, in order from a line having a large weight.

When weighs of vertices or weights of lines are uniform, there may exist a plurality of pieces of matching in which the evaluation function becomes minimum. When the plurality of pieces of matching, the pattern search module 109 outputs all graphs on which matching is performed, to the similar area search module 111, as search results.

Figure 6:
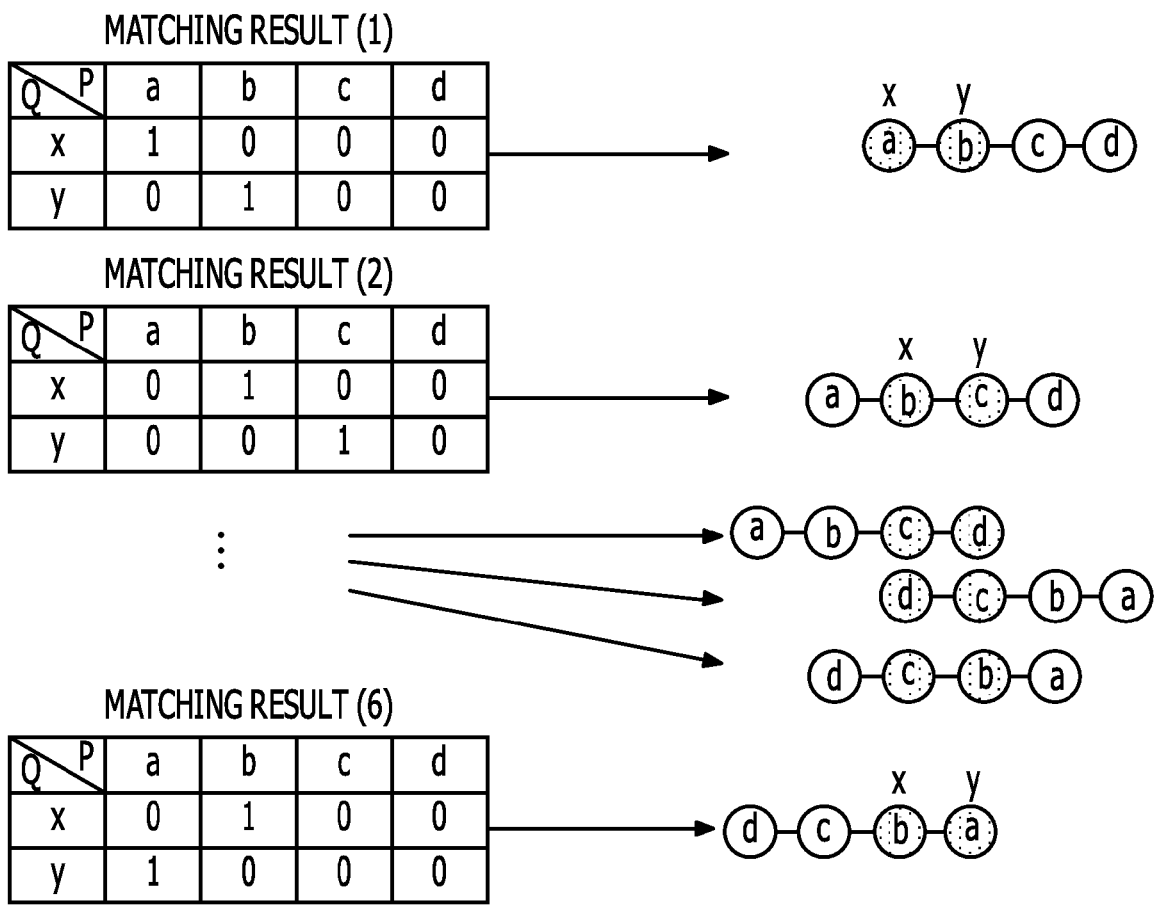
FIG. 6 is a diagram illustrating an example of a result of partial matching between a graph P and a graph Q.

FIG. 6 is a diagram illustrating an example of a result of partial matching between a graph P and a graph Q. In the example of FIG. 6, six matching results are obtained. When a field of each table illustrated in FIG. 6 is "1", it is indicated that two vertices that are described in the corresponding row and column are matched. When a field of each of the tables that are illustrated in FIG. 6 is "0", it is indicated that the two vertices are not matched.

For example, in the matching result (1), a vertex "x" of the graph Q is matched with a vertex "a" of the graph P, and a vertex "y" of the graph Q is matched with a vertex "b" of the graph P. FIG. 6 illustrates positional relationships between graphs that correspond to the matching results of the respective tables.

Search Process

A process of searching for a similar area is described below. The similar area search module 111 sets an area that includes a vertex of a graph other than the graph Q, out of the searched graphs, as a similar area candidate. The similar area search module 111 calculates an image feature amount in turn, for one or more similar area candidates, and calculates a distance between the image feature amount and an image feature amount of an area in the target image. In addition, the similar area search module 111 sets a difference absolute value sum, etc. of pixel values in two areas, as similarity, and similarity determination may be performed using the similarity.

For example, in a case in which a color (R, G, and B) histogram is used, a frequency for a value of a certain number (for example, 200), out of histogram for each of values 0 to 255 in an area is vectorized and used as an image feature amount. In addition, the image feature amount may be an edge amount of an edge, which is obtained by performing edge extraction.

The similar area search module 111 determines that a similar area candidate is similar to the area in the target image when an obtained distance is less than a threshold value that is set beforehand, and set the similar area candidate as a similar area. The similar area is output to the display module 113 as a candidate area.

Display Process

A display process of an area candidate is described below. The display module 113 displays the candidate area obtained from the similar area search module 111 on the screen so as to distinguish the candidate area from the area that has been specified. As a result, the author may grasp the candidate area easily.

Figure 7:
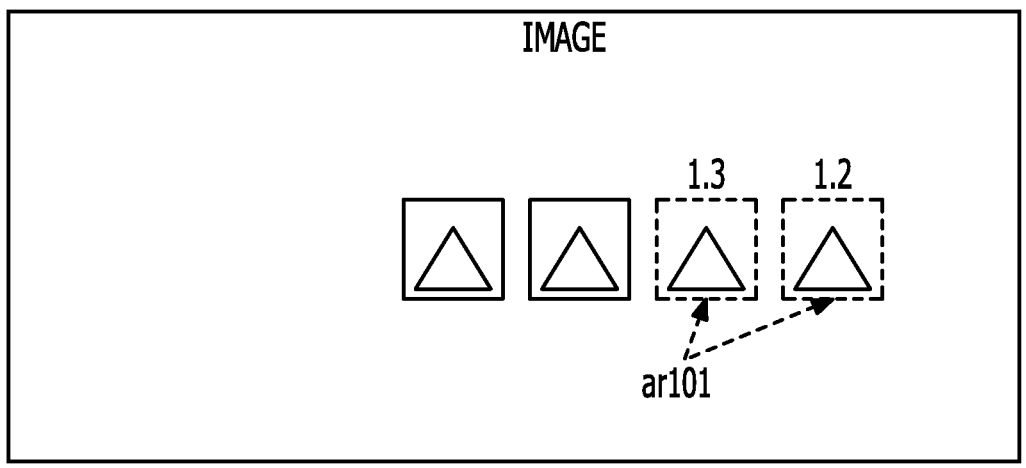
FIG. 7 is a diagram illustrating a display example of a candidate area.

FIG. 7 is a diagram illustrating a display example of a candidate area. In the example of FIG. 7, a candidate area ar101 is indicated by a dotted line frame, and distinguished from a solid line frame of the area that has already been specified by the author. As illustrated in FIG. 7, the display module 113 displays an evaluation value of the candidate area around the candidate area ar101. The evaluation value is a distance or similarity that is used for similarity determination. As a result, the author may grasp reliability of the candidate area.

Registration Process

A process of registering a candidate area as an image corpus is described below. When a candidate area is specified and a registration instruction is reported from the obtaining module 105, the corpus registration module 115 stores, as an image corpus, the specified candidate area in the corpus storage module 117. At this time, the corpus registration module 115 associates an attribute "pylon" with the area and performs registration of the attribute in association with the area.

For example, in the example of FIG. 7, in a state in which the two candidate areas ar101 are specified, when the author presses a "save" button, the obtaining module 105 obtains a registration instruction and reports the registration instruction to the corpus registration module 115. As a result, the two candidate areas ar101 are associated with the attribute "pylon" and are registered as an image corpus.

Operation

Figure 8:
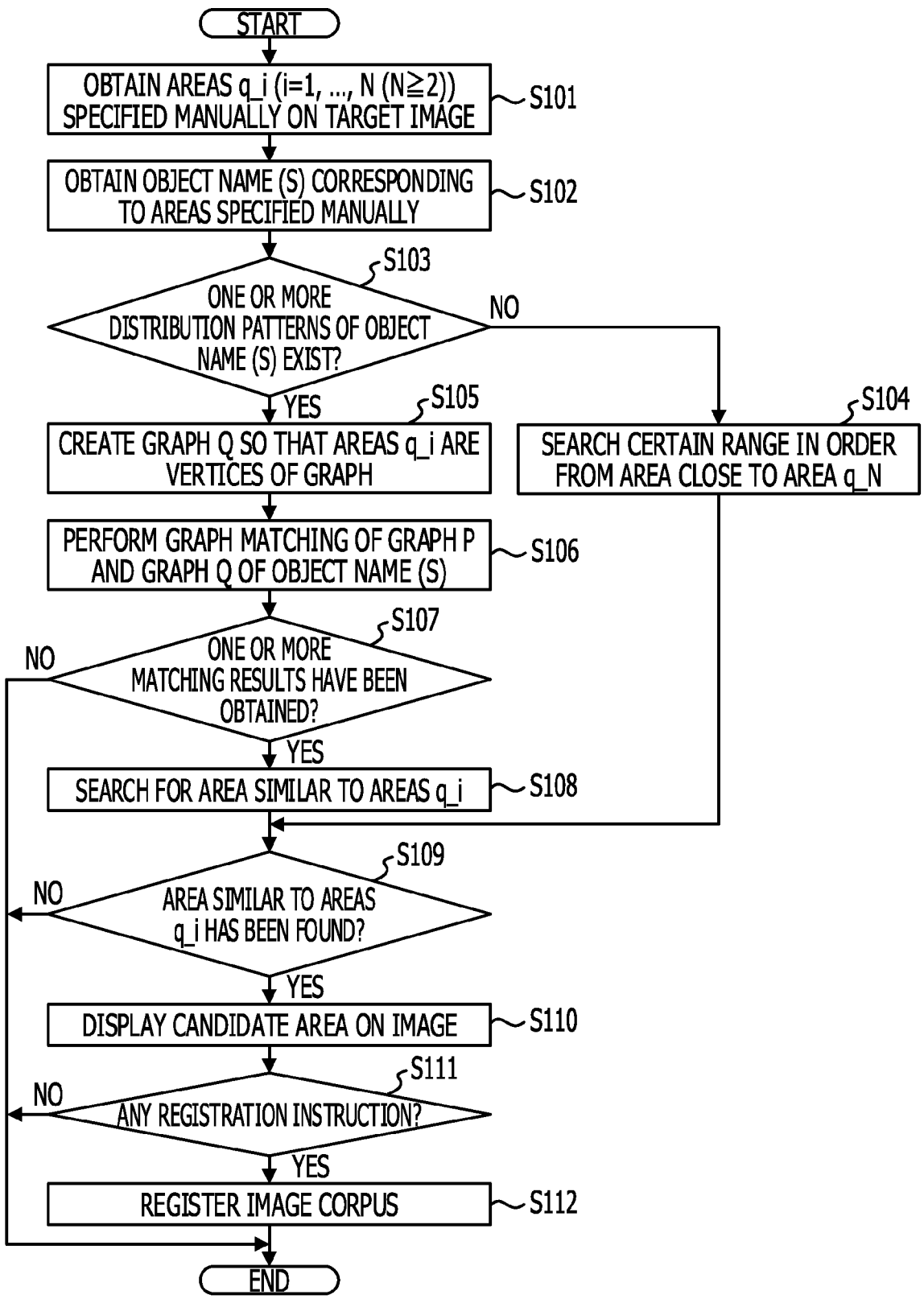
FIG. 8 is a flowchart illustrating an example of image processing according to the first embodiment.

An operation of the image processing apparatus 10 is described below. FIG. 8 is a flowchart illustrating an example of image processing according to the first embodiment.

In Step S101 illustrated in FIG. 8, the obtaining module 105 obtains an areas q_i (i=1, 2, 3, . . . , N (N≥2)) that are specified by the author, on a target image.

In Step S102, the obtaining module 105 obtains an object name (S) that corresponds to the specified areas and input by the author.

In Step S103, the pattern reading module 107 determines whether or not one or more distribution patterns (for example, graph) having an object name identical to the object name (S) exists in the pattern storage module 103. The flow proceeds to Step S105 when the distribution patterns exist in the pattern storage module 103 (YES in Step S103), and the flow proceeds to Step S104 when the distribution patterns do not exist in the pattern storage module 103 (NO in Step S103).

In Step S104, the image processing apparatus 10 searches, for example, a certain range in order from an area close to the area q_N.

In Step S105, the pattern creation module 101 automatically creates a graph Q so that the areas q_i are vertices of the graph.

In Step S106, the pattern search module 109 performs graph matching of a graph P and a graph Q of the object name (S) that is stored in the pattern storage module 103.

In Step S107, the pattern search module 109 determines whether or not one or more matching results of the graph matching have been obtained. The flow proceeds to Step S108 when one or more matching results are obtained (YES in Step S107), and the process ends when one or more matching results are not obtained (NO in Step S107).

In Step S108, the similar area search module 111 searches for an area similar to the areas q_i on the basis of the area of the graph P of the matching result.

In Step S109, the similar area search module 111 determines whether or not an area similar to the areas q_i has been found for on the basis of, for example, a distance of image feature amounts of the areas. The flow proceeds to Step S110 when the area similar to the areas q_i has been found (YES in Step S109), and the process ends when the area similar to the areas q_i is not found (NO in Step S109).

In Step S110, the display module 113 displays a candidate area that is regarded as a similar area on the image so as to distinguish the candidate area from the area specified by the author.

In Step S111, the corpus registration module 115 determines whether or not there is a registration instruction from the author. The flow proceeds to Step S112 when there is a registration instruction (YES in Step S111), and the process ends when there is no registration instruction (NO in Step S111).

In Step S112, the corpus registration module 115 registers to the corpus storage module 117 an image corpus in which an object name as an attribute is associated with a candidate area to which a registration instruction is issued. As a result, in the corpus storage module 117, the area that is specified by the author and an attribute (for example, an object name) of the area are stored.

As described above, according to the first embodiment, when creation of an image corpus is supported, efficiency of similar area search may be improved.

Second Embodiment

An image processing apparatus according to a second embodiment is described below. In the second embodiment, for a similar area candidate, a priority level is calculated, and similarity determination is performed in order of preference. As a result, display may be performed in order from a candidate area having a high priority level, for the author.

Configuration

Figure 9:
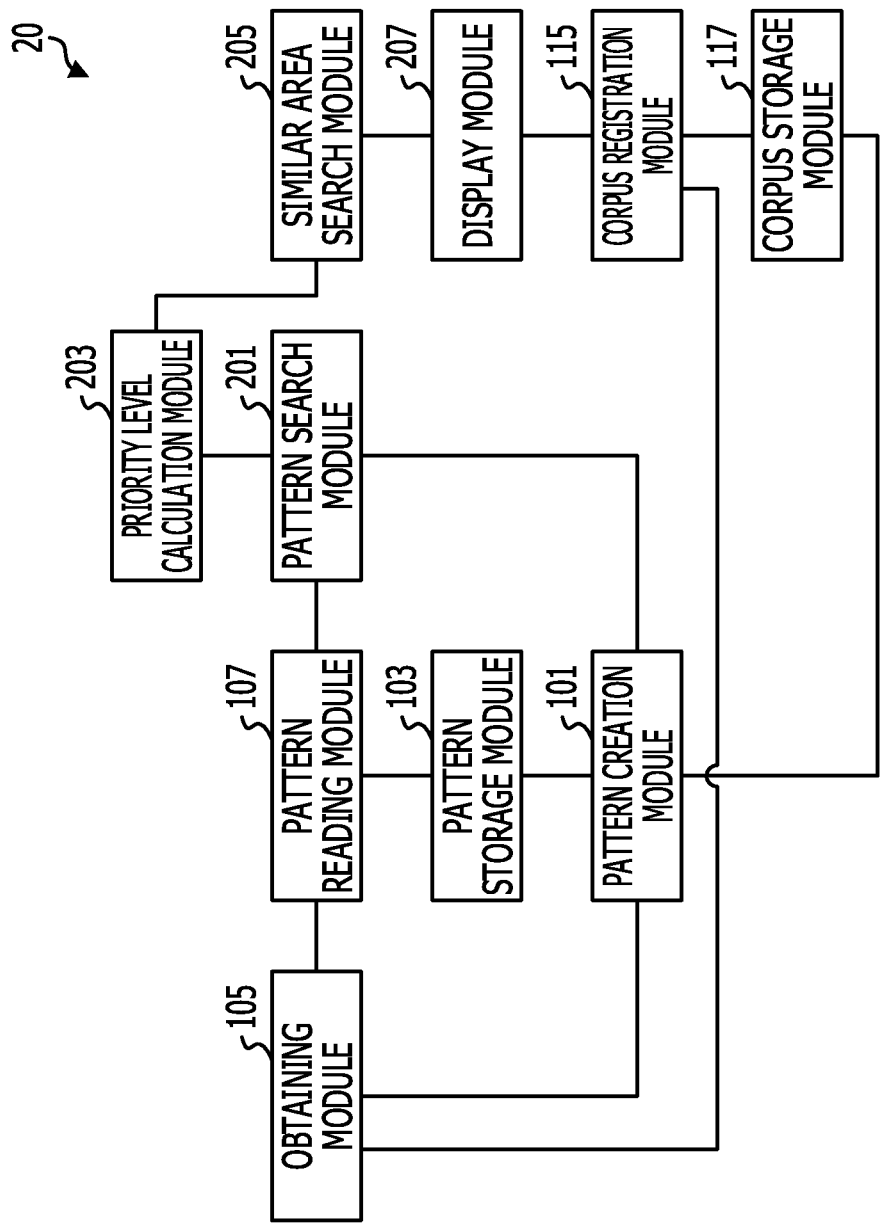
FIG. 9 is a block diagram illustrating an example of a configuration of an image processing apparatus according to a second embodiment.

FIG. 9 is a block diagram illustrating an example of a configuration of an image processing apparatus 20 according to the second embodiment. In the configuration illustrated in FIG. 9, the same reference symbols are given to the same elements as those of FIG. 1. The configuration different from that of the first embodiment is mainly described below.

A pattern search module 201 includes a basic function that is similar to that of the pattern search module 109 according to the first embodiment, and is different form the pattern search module 109 in that a search result is output to a priority level calculation module 203.

The priority level calculation module 203 associates areas in a plurality of distribution patterns that are obtained from the pattern search module 201 with areas on a target image, respectively, and calculates a priority level of the area on the basis of the number of areas that exist on the associated positions.

The priority level calculation module 203 may calculates a priority level in order from a distribution pattern having the large number of hits of a search result of the pattern, when there is a plurality of distribution patterns that are searched for. As a result, a priority level of a distribution pattern having an anomalistic hit may be reduced.

The priority level calculation module 203 weights a priority level on the basis of an evaluation value of the equation (1) that is used for the search process in the pattern search module 201. As a result, the evaluation value that is calculated at the time of matching process may be effectively utilized.

The priority level calculation module 203 obtains the number of vertices that indicates the number of areas in a case in which one vertex of a graph P is matched with a vertex of a graph Q of the target image when lengths of corresponding lines of the graph P and the graph Q are not in accordance with each other, and may calculate a priority level on the basis of the number of vertices. The above-described similarity calculation process is described later in detail.

The priority level calculation module 203 associates the calculated priority level with the area, and outputs the associated priority level and area to a similar area search module 205.

The similar area search module 205 searches for the area having a high priority level that is calculated in the priority level calculation module 203 on a priority basis. For example, the similar area search module 205 searches for a similar area in descending order of a high priority level. The similar area search module 205 reports a candidate area to a display module 207 each time the candidate area that is determined to be similar to the area in the target image is found. The similar area search module 205 may not report a candidate area in order, and may reports all candidate areas to the display module 207 after all the candidate areas are found.

The display module 207 displays a candidate area on the target image with the candidate area being distinguished from the area that is specified by the author each time the display module 207 obtains a candidate area from the similar area search module 205. The process of registering the displayed candidate area as an image corpus is similar to that of the first embodiment.

Priority Level Calculation Process

A priority level calculation process is described below in detail. The priority level calculation module 203 calculates a priority level of a similar area candidate in a target image using a result of partial matching which is obtained by search in the pattern search module 201.

Figure 10:
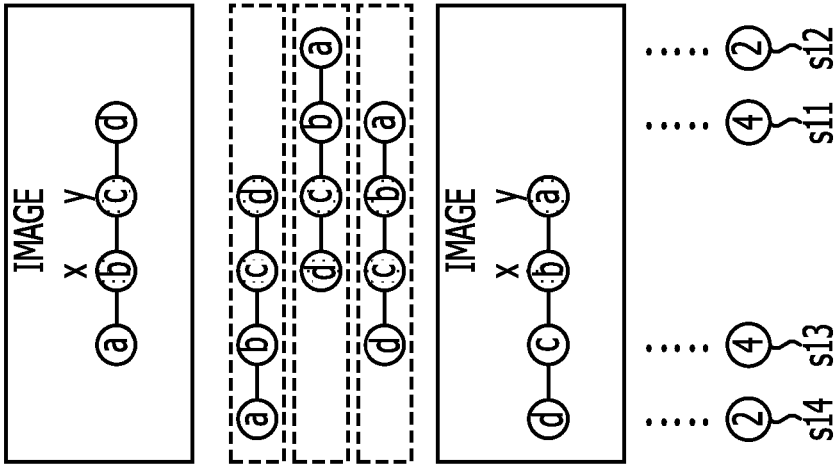
FIG. 10 is a diagram illustrating a priority level calculation process.

FIG. 10 is a diagram illustrating the priority level calculation process. In the example of FIG. 10, there are six results of partial matching, and the matching result (1) illustrated in FIG. 6 is described below as an example.

First, the priority level calculation module 203 puts a vertex "x" and a vertex "y" of a graph Q that is created from the target image on an original coordinate position on the target image. Next, the priority level calculation module 203 obtains a position of each vertex of a graph P on the target image.

For example, a vertex "a" of the graph P has a coordinate value that is identical to that of the vertex "x", and a vertex "b" of the graph P has a coordinate value that is identical to that of the vertex "y". As long as coordinate values of the vertex "a" and the vertex "b" of the graph P are obtained, coordinate values of the remaining vertex "c" and vertex "d" may be obtained from a connection relationship of lines of the graph. The priority level calculation module 203 obtains a coordinate value of each of vertices of the graph P for all the results of partial matching, similarly to the matching result (1).

Next, the priority level calculation module 203 counts the number of vertices of the graph P in each position on the target image. In the example of FIG. 10, for example, the number of vertices in a position s11 on the right side of the vertex "y" is four. This is because there are four vertices, out of the six matching results. The four is a vertex "c" in the result (1), a vertex "d" in the result (2), a vertex "b" in the result (4), and a vertex "a" in the result (5).

Similarly, the number of vertices in a position s12 on the right side of the position s11 is two, the number of vertices in a position s13 on the left side of the vertex "x" is four, and the number of vertices in a position s14 on the left side of the position s13 is two.

The priority level calculation module 203 regards a position having more vertices that are obtained as described above, as the area having a higher priority level.

In addition, in a case in which the priority level calculation module 203 counts the number of vertices of a graph in units of pixel, the priority level calculation module 203 does not regard positions to be similar to each other when coordinate values of vertices are different even by one pixel. Therefore, as a method of treating a subtle position shift robustly, the priority level calculation module 203 may count the number of vertices in a grid module by putting K pixels in a unit and dividing an image into a grid.

Figure 11:
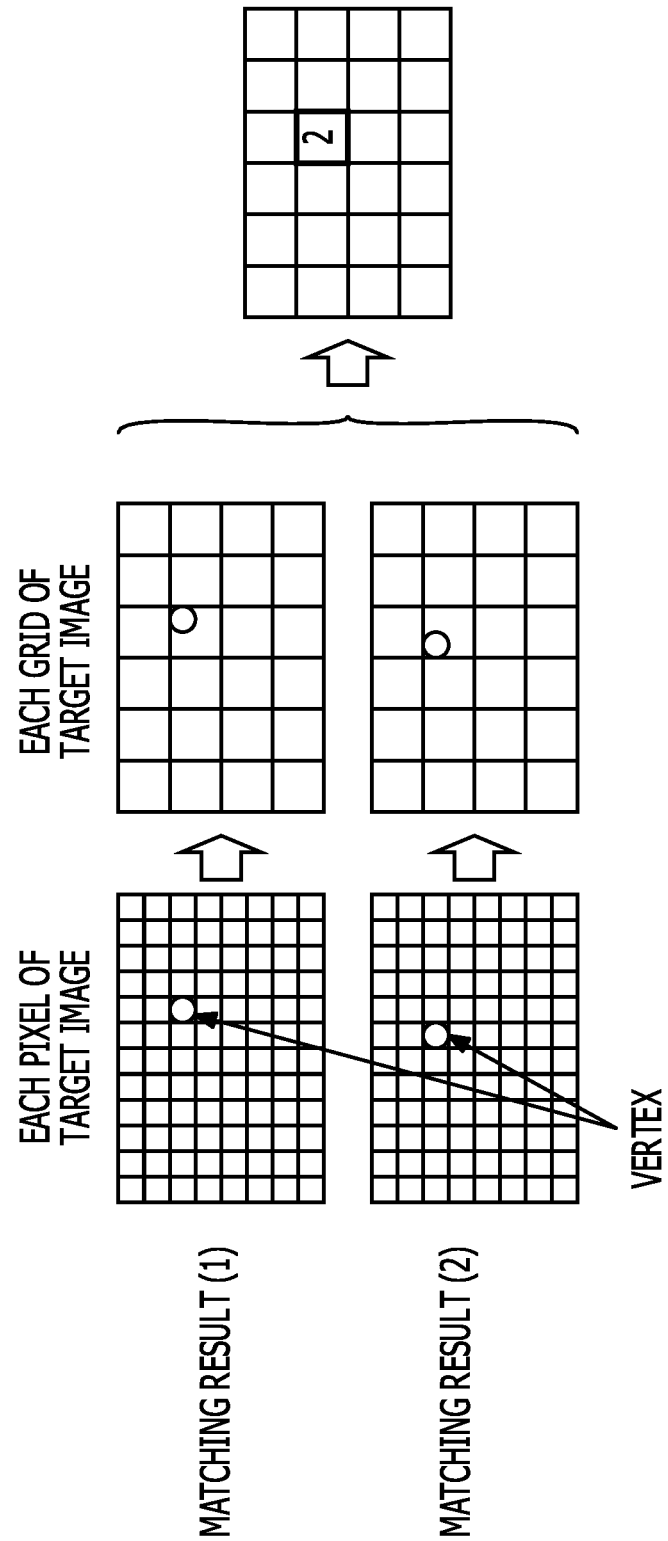
FIG. 11 is a diagram illustrating an example in which the number of vertices on a grid is counted.

FIG. 11 is a diagram illustrating an example in which the number of vertices on a grid is counted. In the example of FIG. 11, 2×2 pixels are put together in one grid. As a result, for two vertices that are different in terms of a pixel unit, the number of vertices may be counted using the identical grid on a grid.

In addition, the case is described above, in which there is one graph P, and a case is described below in which there are two or more graphs the object name of which corresponds to a "pylon". At this time, the priority level calculation module 203 may calculate a priority level using all of matching results.

In addition, the priority level calculation module 203 may calculates a priority level of a graph P in descending order of the number of hits that has been searched for in the pattern search module 201. FIG. 12 is a diagram illustrating a priority level calculation process based on the number of hits. As illustrated in FIG. 12, for each pattern of a result of a preceding operation, the number of hits by graph matching in the pattern search module 201 is stored, for example, in the pattern storage module 103.

The priority level calculation module 203 may calculate a priority level by selecting one graph (graph P) in descending order of the number of hits. In the example of FIG. 12, a priority level is calculated from a pattern 1 because the number of hits of the pattern 1 is larger. As a result, a priority level of each area of the graph may be calculated by prioritizing the areas even when a plurality of graphs are obtained by matching.

In addition, when the priority level calculation module 203 counts the number of vertices of the graphs, the priority level calculation module 203 may multiply the number of vertices by, as a weight, a reciprocal number of an evaluation value (positive real number) of an evaluation function obtained when the graphs are obtained by matching.

Figure 13:
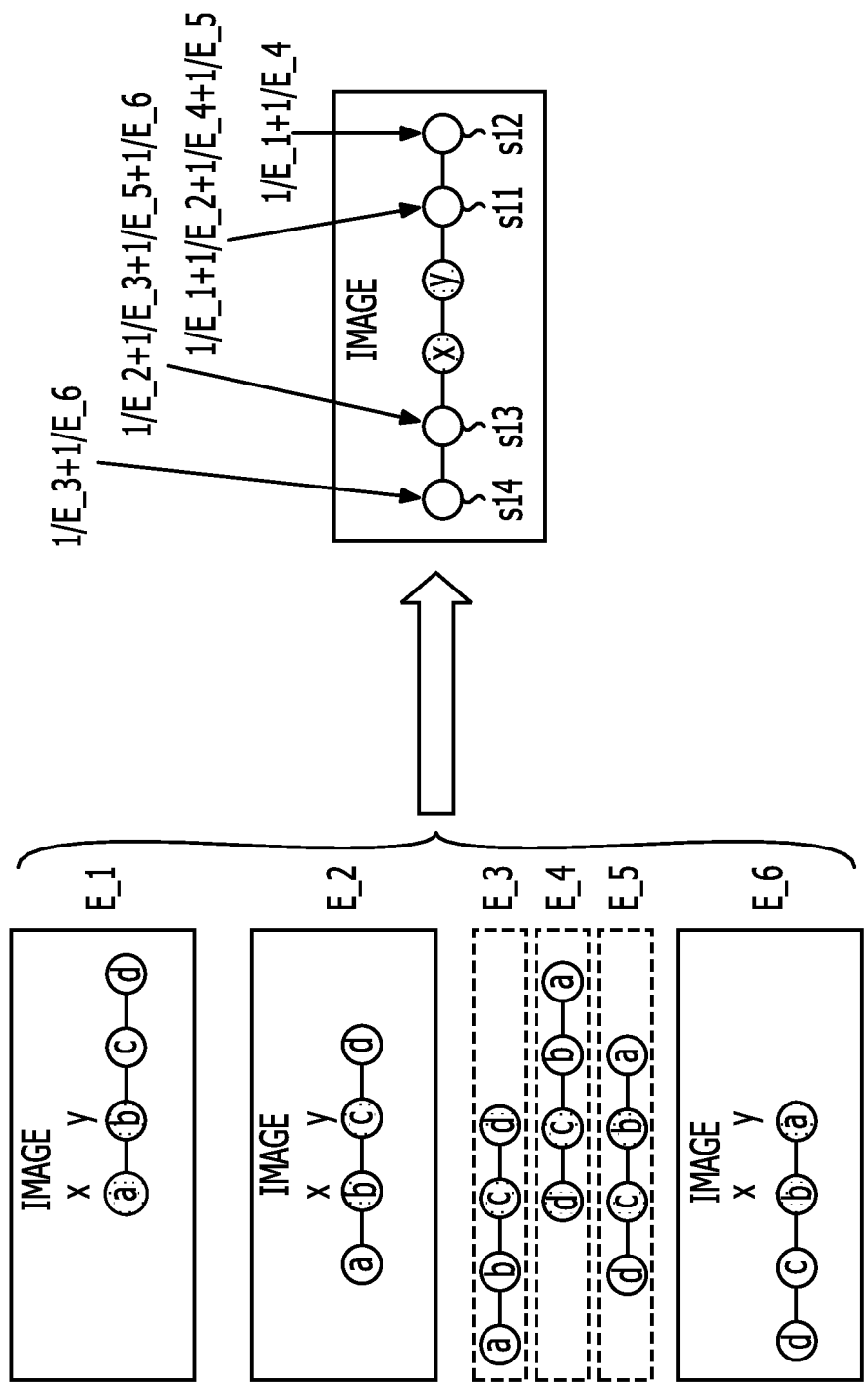
FIG. 13 is a diagram illustrating weighting of a priority level.

FIG. 13 is a diagram illustrating weighting of a priority level. In the example of FIG. 13, an evaluation value of an evaluation function is represented by $E\_n$. The "n" is a number that indicates a matching result. Here, evaluation values of the matching results (1) to (6) are represented by $E\_1$ to $E\_6$.

The priority level calculation module 203 performs addition of a weight that is proportional to a reciprocal number of an evaluation value, for example, when the priority level calculation module 203 counts the number of vertices in each position on the image. A priority level of a position s14 is represented by "1/E_3+1/E_6".

Similarly, a priority level of a position s13 is represented by "1/E_2+1/E_3+1/E_5+1/E_6", a priority level of a position s11 is represented by "1/E_1+1/E_2+1/E_4+1/E_5", and a priority level of a position s12 is represented by "1/E_1+1/E_4".

In addition, as a result of graph matching, the lengths of lines may be different between corresponding graphs. At this time, the priority level calculation module 203 obtains respective priority levels when corresponding vertices of the corresponding graphs are matched with each other and counts the number of vertices of the graph using a value obtained by dividing by the number of vertices to occur.

Figure 14:
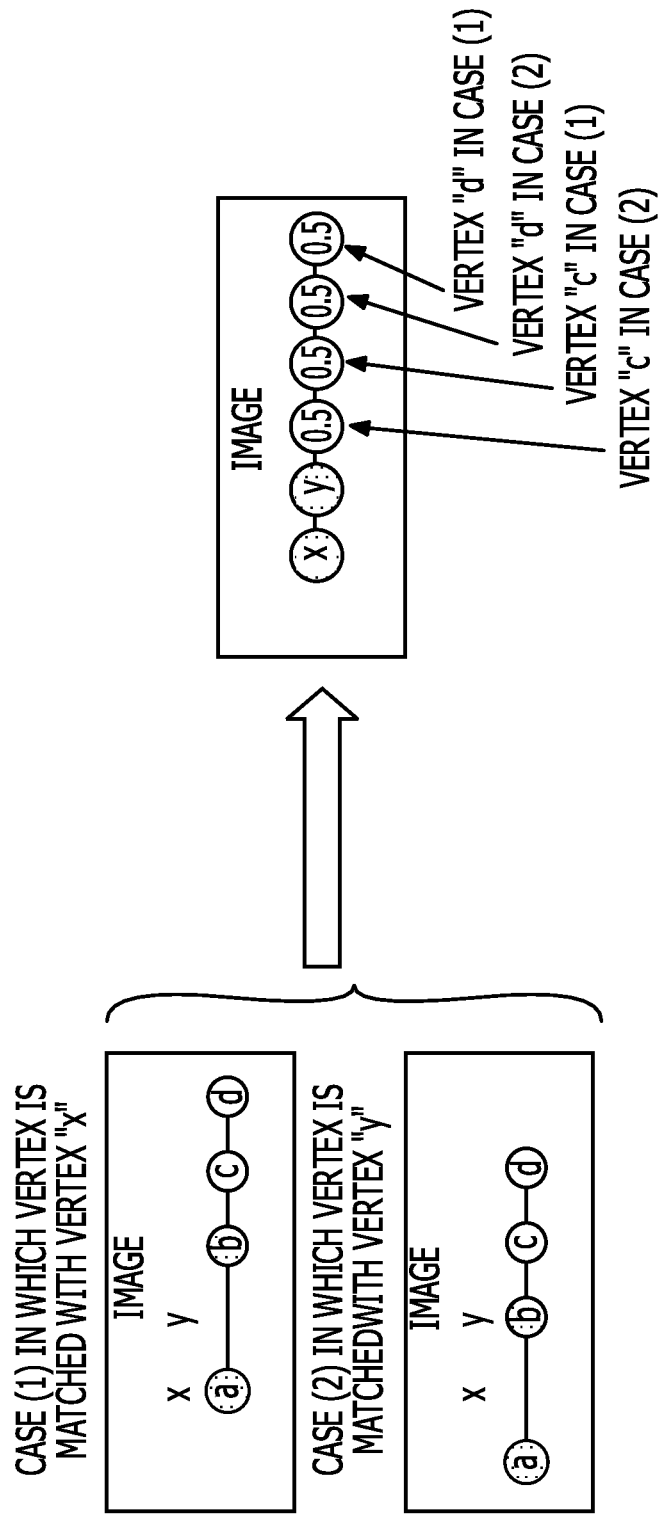
FIG. 14 is a diagram illustrating a priority level calculation process when the lengths of corresponding lines are different.

FIG. 14 is a diagram illustrating a priority level calculation process when the lengths of corresponding lines are different from each other. In the example of FIG. 14, there are occurring two cases of a case (1) in which the vertex "x" and the vertex "a" are matched with each other, and a case (2) in which the vertex "y" and the vertex "b" are matched with each other.

First, the priority level calculation module 203 ignores the vertex "y" that is not matched with the vertex "b" in the case (1) and vertex "x" that is not matched with the vertex "a" in the case (2). After that, the priority level calculation module 203 counts, from left to right on the target image, the number of vertices (priority level) of each of the vertex "c" of the case (2), the vertex "c" of the case (1), the vertex "d" of the case (2), and the vertex "d" of the case (1), as 0.5. As a result, a priority level may be calculated even when the lengths of corresponding lines are different.

Search, display, and registration processes of a similar area

A search process and a display process of a similar area according to a second embodiment are descried below. The similar area search module 205 searches for an area having a high priority level, which is calculated in the priority level calculation module 203 on a priority basis.

Figure 15:
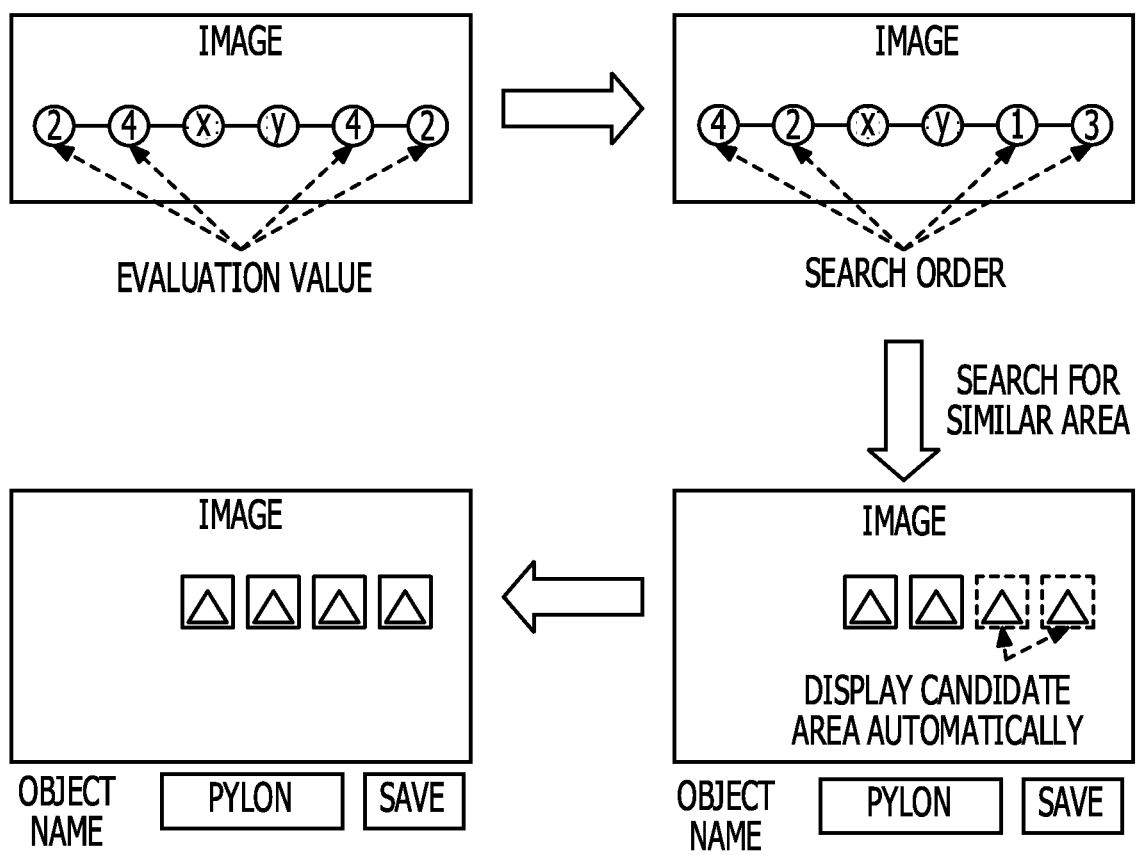
FIG. 15 is a diagram illustrating processes from a search process to a registration process according to the second embodiment.

When priority levels are equivalent, the similar area search module 205 determines, for example, search order, randomly. FIG. 15 is a diagram illustrating the processes from the search process to the registration process according to the second embodiment.

In the example of FIG. 15, priority levels of both the position on the right side of the vertex "y" and the position on the left side of the vertex "x" are four that is a maximum value. Therefore, the similar area search module 205 randomly selects a position from positions having an equal priority level. In the example of FIG. 15, the similar area search module 205 determines search order of the position on the right side of the vertex "y" as first order, and determines search order of the position on the left side of the vertex "x" as second order. Similarly, the similar area search module 205 determines third order and fourth order of the search order. The similar area search module 205 searches for a similar area in accordance with the order that is determined as described above.

The similar area search module 205 obtains a distance between an image feature amount of the query and an image feature amount having the first search order. The similar area search module 205 determines the candidate area to be similar to the area in the target image when the obtained distance is less than the threshold value, and outputs the area to the display module 207 as a candidate area.

The similar area search module 205 repeats the similar search process for areas of the second search order, the third search order, and the fourth search order.

The display module 207 may display a candidate area each time the display module 207 obtains a candidate area. In the example of FIG. 15, the display module 207 displays areas of the first search order and the third search order as a candidate area. In the example of FIG. 15, the candidate areas are illustrated by the dotted line frame.

After that, the author checks an image of the candidate area and presses a "save" button when there is a "pylon" in the candidate area. The corpus registration module 115 registers the candidate area as an image corpus by associating the candidate area with the "pylon" as an attribute when the "save" button is pressed. The author do not press the "save" button when there is no "pylon" in the candidate area.

As illustrated in FIG. 15, when candidate areas are determined as an image corpus, the candidate areas are displayed by a solid line frame. The display module 207 displays the registered candidate areas by the solid line frame similarly to the area that is specified by the author.

In addition, the similar area search module 205 uses an image feature amount of the area that is specified manually at the end, as a query to be used when a similar area is searched for, because there are a plurality of areas that are specified by the author such as an area "x" and an area "y".

In addition, the similar area search module 205 may use an image feature amount that is obtained by averaging the image feature amounts of an area "x" and an area "y". In addition, the similar area search module 205 may use image information of an area in a pattern P of a preceding operation result that is obtained as a graph matching result.

Figure 16:
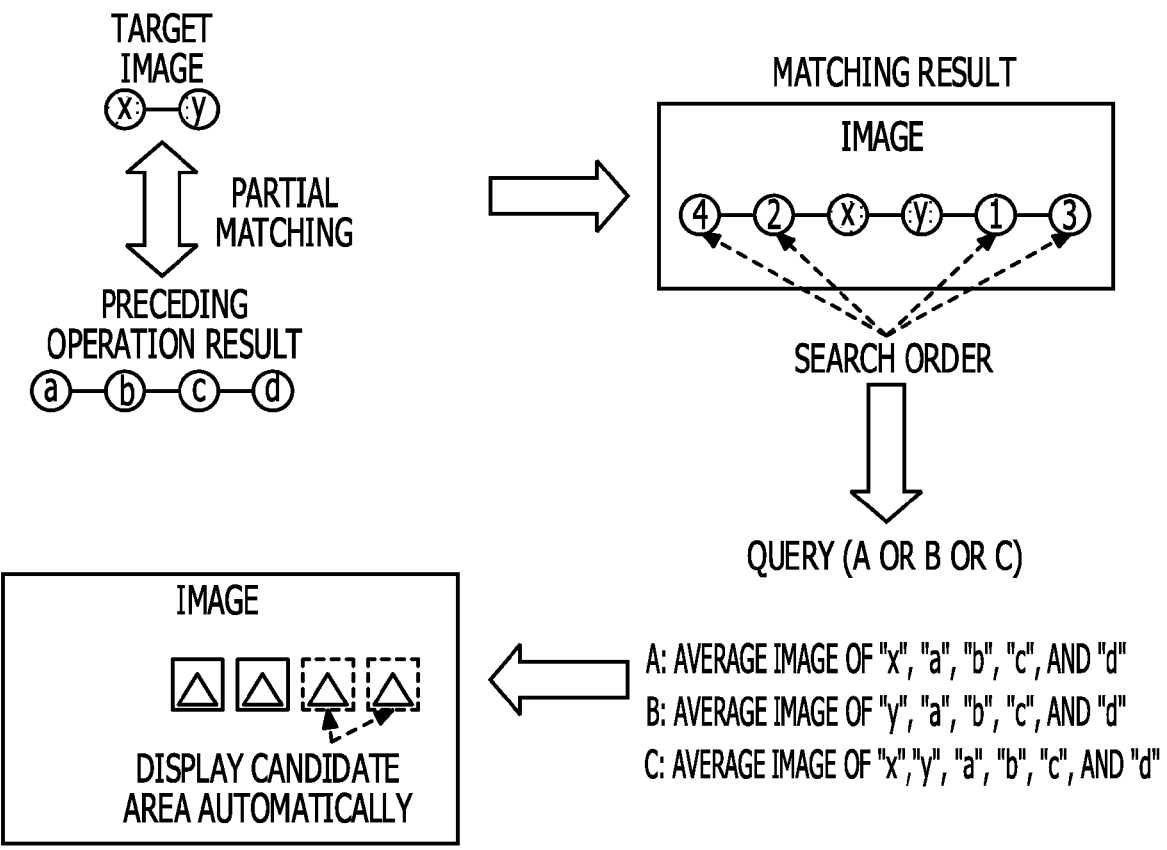
FIG. 16 is a diagram illustrating an example of a query.

FIG. 16 is a diagram illustrating an example of a query. As illustrated in FIG. 16, the similar area search module 205 may create an average image using an area "x" and an area "y", and areas "a", "b", "c", and "d" in the pattern P of the preceding operation result, and set the average image as a new query image. For example, an average image of the areas "x", and "a" to "d" is used in a query A, an average image of the areas "y", and "a" to "d" is used in a query B, and an average image of the areas "x" and "y", and "a" to "d" is used in a query C. The similar area search module 205 determines a query to be used beforehand. As described above, in the second embodiment, an area candidate may be obtained on the basis of a priority level.

Operation

Figure 17:
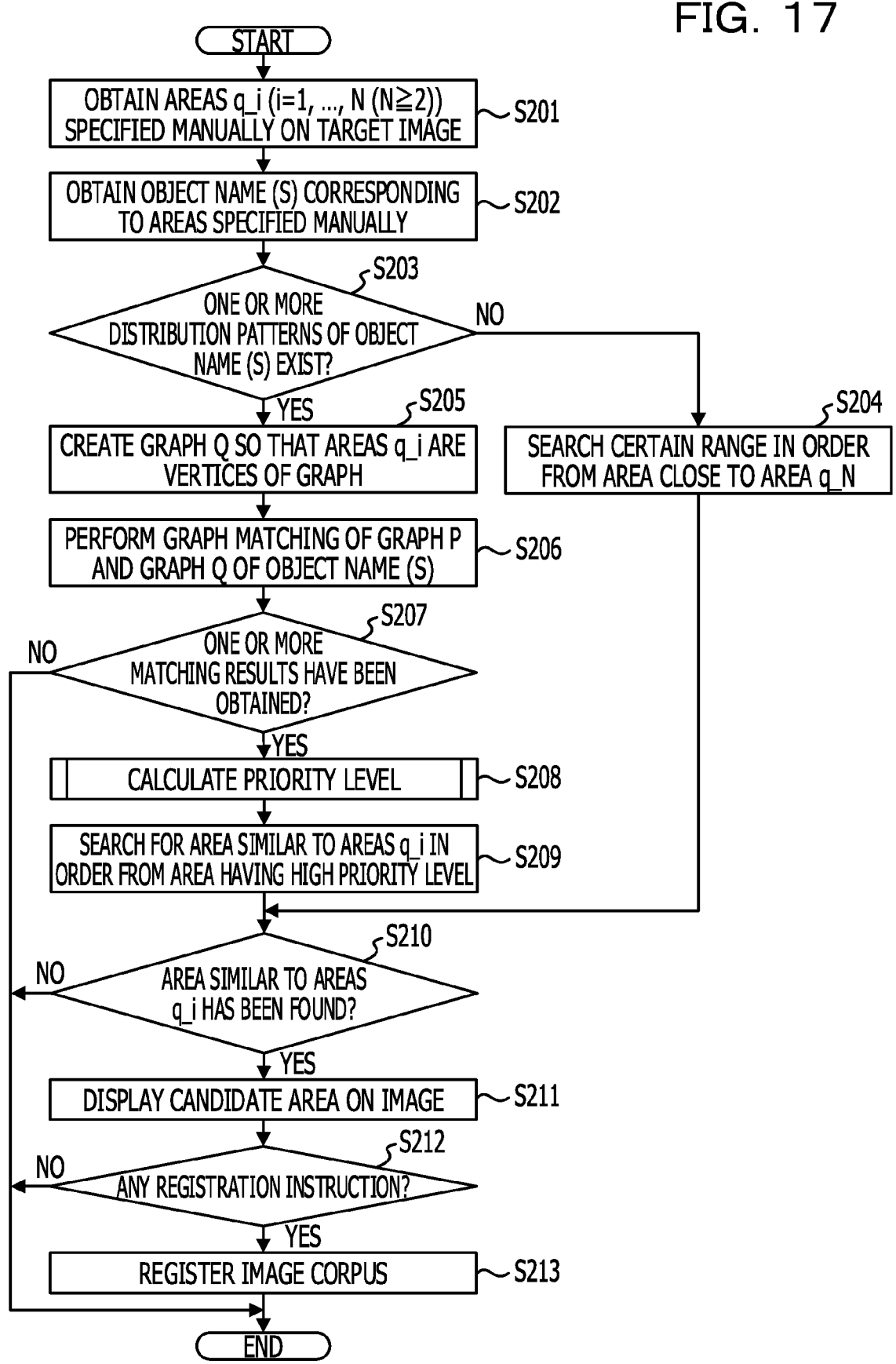
FIG. 17 is a flowchart illustrating an example of image processing according to the second embodiment.

An operation of the image processing apparatus 20 according to the second embodiment is described below. FIG. 17 is a flowchart illustrating an example of image processing according to the second embodiment. A process of Steps S201 to S207 illustrated in FIG. 17 is similar to the process of Steps S101 to S107 illustrated in FIG. 8, and the description thereof is not repeated.

In Step S208, the priority level calculation module 203 calculates a priority level by matching a matching result with the position on the target image. The priority level calculation process is described later with reference to FIG. 18.

In Step S209, the similar area search module 205 searches for an area that is similar to the areas q_i, in order from an area having a high priority level.

A process of Steps S210 to S213 is similar to the process of Steps S109 to S112 illustrated in FIG. 8. In Step S211, the display module 207 may display a candidate area in descending order of the priority level.

Figure 18:
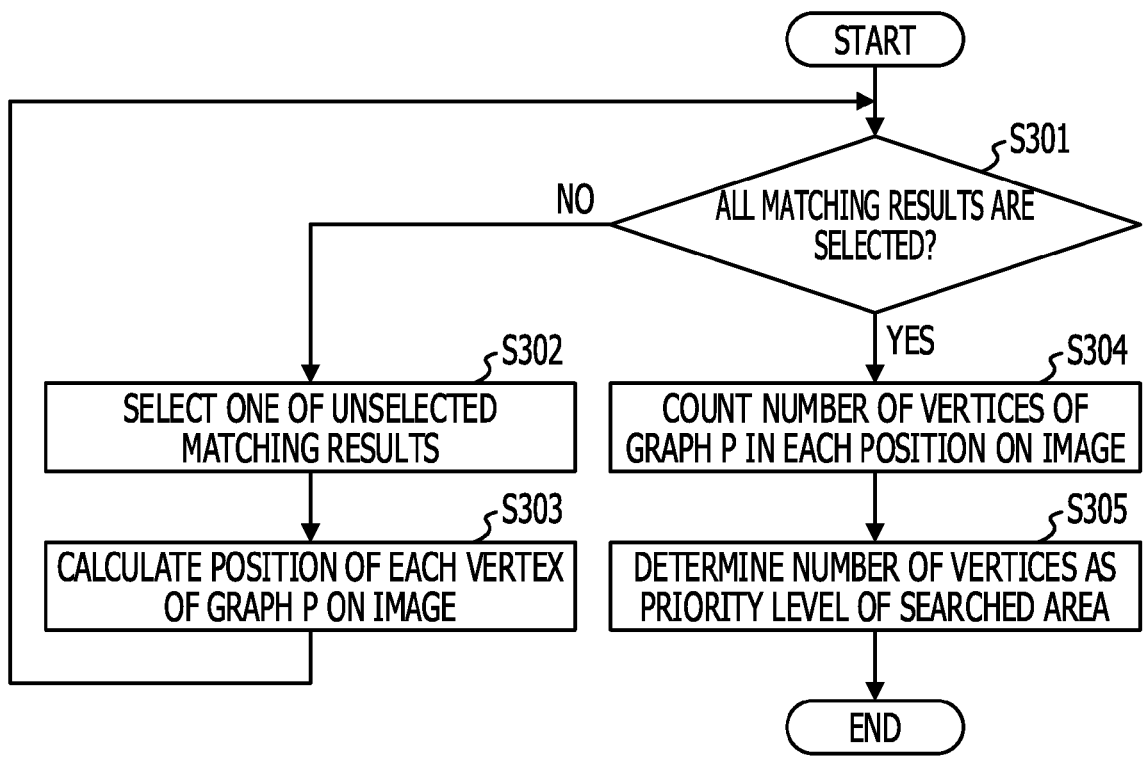
FIG. 18 is a flowchart illustrating an example of a priority level calculation process according to the second embodiment.

FIG. 18 is a flowchart illustrating an example of a priority level calculation process according to the second embodiment. In Step S301 illustrated in FIG. 18, the priority level calculation module 203 determines whether or not all the matching results are selected. The flow proceeds to Step S304 when all matching results are selected (YES in Step S301), and the flow proceeds to Step S302 when not all the matching results are selected (NO in Step S301).

In Step S302, the priority level calculation module 203 selects one of unselected matching results.

In Step S303, the priority level calculation module 203 calculates a position of each vertex of a graph P on the target image.

In Step S304, the priority level calculation module 203 counts the number of vertices of the graph P in each of the positions of the target image.

In Step S305, the priority level calculation module 203 determines the number of vertices as a priority level of an area that is searched for.

As described above, according to the second embodiment, a priority level may be assigned to an area to be searched, so that search of a similar area may be streamlined.

Third Embodiment

An image processing apparatus according to a third embodiment is described below. In the third embodiment, the image processing that is described in the first and second embodiments is executed in an information processing apparatus such as a personal computer (PC) or a server.

Configuration

Figure 19:
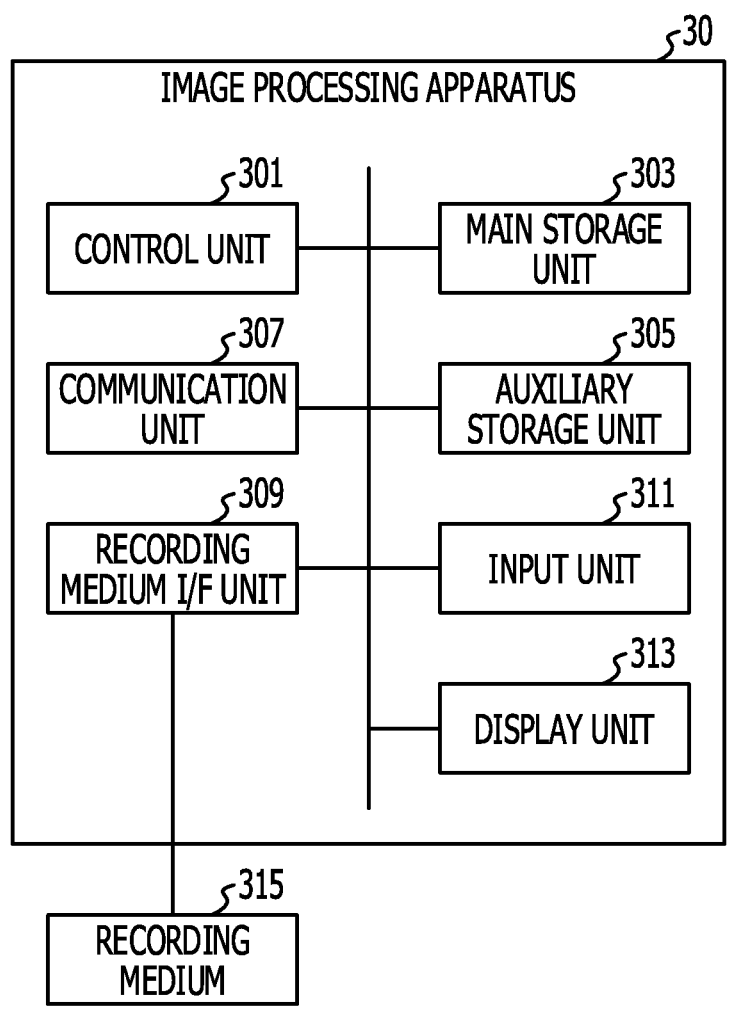
FIG. 19 is a block diagram illustrating an example of a configuration of an image processing apparatus according to a third embodiment.

FIG. 19 is a block diagram illustrating an example of a configuration of an image processing apparatus 30 according to the third embodiment. The image processing apparatus 30 illustrated in FIG. 19 includes at least a control unit 301, a main storage unit 303, an auxiliary storage unit 305, a communication unit 307, a recording medium interface (I/F) unit 309, an input unit 311, and a display unit 313. The units are connected to each other through a bus so as to transmit and receive data mutually.

The control unit 301 is a central processing unit (CPU) that performs control of each device, and calculation and processing of data in a computer. In addition, the control unit 301 is a calculation device that executes a program that is stored in the main storage unit 303 and the auxiliary storage unit 305, receives data from the communication unit 307 and each of the storage units, and outputs the data subjected to calculation and processing to an output unit and each of the storage units.

In addition, the control unit 301 executes, for example, the image processing programs according to the first and second embodiments that are stored in the auxiliary storage unit 305, and executes a function of searching for a candidate area and a function of registering an image corpus.

The main storage unit 303 is a read only memory (ROM), a random access memory (RAM), etc. and is a storage device that stores or temporarily saves data and programs such as application software and an operating system (OS) that is basic software executed by the control unit 301.

The auxiliary storage unit 305 is a hard disk drive (HDD), etc., and is a storage device that stores data related to application software, etc. In addition, the auxiliary storage unit 305 may store the image processing programs according to the first and second embodiments that are obtained from a recording medium 315, etc. and an image that is obtained from the communication unit 307.

The communication unit 307 performs communication through a wired or wireless network. The communication unit 307 obtains, for example, a target image to be created for an image corpus.

The recording medium I/F unit 309 is an interface between the recording medium 315 (for example, a flash memory, etc.) and the image processing apparatus 30 that are connected to each other through a data transmission path such as a universal serial bus (USB).

In addition, the recording medium 315 stores the image processing program, the image processing program stored in the recording medium 315 is installed to the image processing apparatus 30 through the recording medium I/F unit 309. The installed image processing program may be executed by the image processing apparatus 30.

The input unit 311 includes a keyboard including a cursor key, numeric character input keys, and various function keys, a mouse and a slide pad that are used to select a key on the display screen of the display unit 313. In addition, the input unit 311 is a user interface that is used to issue an operation instruction to the control unit 301 and to input data by the author.

The display unit 313 is, for example, a liquid crystal display (LCD), etc., and performs display in accordance with display data that is input from the control unit 301.

The pattern storage module 103 according to the first and second embodiments is realized, for example, by the main storage unit 303. The corpus storage module 117 according to the first and second embodiments is realized, for example, by the auxiliary storage unit 305. The obtaining module 105 is realized, for example, by the input unit 311. The display module 113 is realized, for example, by the display unit 313.

The pattern reading module, the pattern search module, the similar area search module, the corpus registration module according to the first and second embodiments are realized, for example, by the control unit 301 and the main storage unit 303 as a working memory.

The program that is executed by the image processing apparatus 30 has a module configuration that includes modules other than the storage module that are described in the first and second embodiments. As actual hardware, when the control unit 301 reads the program from the auxiliary storage unit 305 and executes the program, one or more modules, out of the above-described modules are loaded on the main storage unit 303, and the one or more modules are created on the main storage unit 303.

By recording the program that is used to realize the image processing described in the above-described embodiments to a recording medium, a computer is caused to execute the image processing according to the embodiments. For example, the program is recorded to the recording medium, and the computer or a mobile device is caused to read the recording medium to which the program is recorded and may be caused to realize the above-described image processing.

Various types of recording medium may be used. Examples of such recording medium include a recording medium that optically, electrically, or magnetically records information therein such as a CD-ROM, a flexible disk, and a magnetic optical disk, and a semiconductor memory that electrically records information therein such as a ROM and a flash memory. The recording medium does not include a carrier wave.

According to the disclosed technology, the efficiency of similar area search may be improved when supporting creation of an image corpus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus, comprising:
a storage configured to store, for a plurality of areas in a target image, attributes and patterns associated with the attributes, each of the attributes being assigned to each the plurality of areas, and each of the patterns being created from areas having an identical attribute among the attributes; and
a processor configured to:
obtain a first area that is specified among the plurality of areas in the target image and an attribute that is assigned to the first area, the target image having a second area among the plurality of areas that is outside of the first area,
search the storage for a pattern of the first area based on similarity between the pattern and a pattern created from a number of areas having the assigned attribute, and
search for the second area in the target image based on similarity between the second area and the number of areas in accordance with a predicted pattern identified based on the pattern of the first area resulting from the search of the storage, the predicted pattern including a geometric pattern of objects to which meta-data is assigned, and
output, to a display device, a pattern identified based on the search for the second area.

2. The image processing apparatus according to claim 1, wherein the processor is further configured to:
associate areas of the predicted pattern with position in the target image respectively,
calculate a priority level of each of the areas based on a number of areas that exist in the associated position, and
search for the second area in descending order of the priority level.

3. The image processing apparatus according to claim 2, wherein the processor is configured to calculate the priority level in order from the predicted pattern having a larger number of hits when there are a plurality of predicted patterns.

4. The image processing apparatus according to claim 2, wherein the processor is configured to weight the priority level using an evaluation value that is used for similarity determination to search the pattern of the first area.

5. The image processing apparatus according to claim 2, wherein
the predicted pattern is a graph that is created using a line that connects vertices to which gravity points of the areas are set, and
the processor is configured to calculate the priority level by matching one vertex of the searched graph with a vertex of a graph of the target image when lengths of lines between corresponding graphs are different from each other.

6. The image processing apparatus according to claim 1, wherein
the processor is configured to search for the second area based on similarity between the second area and an average image of each of the areas in the predicted pattern and one or more areas in the number of areas.

7. The image processing apparatus according to claim 1, wherein
the processor is further configured to:
display the searched area with a format that is different from a format of the number of areas, and display the similarity for the searched area.

8. The image processing apparatus according to claim 1, wherein the processor is further configured to:
create a graph indicating the predicted pattern and including a vertex as a gravity point of the area, a line that is a distance between the vertices and is less than a threshold value, an angle that is obtained by lines connected to the vertex, and a distance of the line.

9. An image processing method, comprising:
obtaining a first area that is specified in a target image and an attribute that is assigned to the first area, the target image having a second area outside of the first area;
searching, with a processor, a storage for a pattern of the first area based on similarity between the pattern and a pattern created from a number of areas having the assigned attribute, the storage storing, for a plurality of areas in the target image, attributes and patterns associated with the attributes, each of the attributes being assigned to each of the plurality of areas, and each of the pattern being created from areas having an identical attribute; and
searching for the second area in the target image based on similarity between the second area and the number of areas in accordance with a predicted pattern identified based on the pattern of the first area resulting from the search of the storage, the predicted pattern including a geometric pattern of objects to which meta-data is assigned, and
outputting, to a display device, a pattern identified based on the search for the second area.

10. The image processing method according to claim 9, further comprising:
associating areas of the predicted pattern with position in the target image, respectively; and
calculating a priority level of each of the areas based on a number of areas that exist in the associated position, wherein
the searching for the second area includes searching for the area in descending order of the priority level.

11. The image processing method according to claim 10, wherein
the calculating includes calculating the priority level in order from the predicted pattern having a larger number of hits when there are a plurality of the predicted patterns.

12. The image processing method according to claim 10, wherein
the calculating includes weighting the priority level using an evaluation value that is used for similarity determination in the searching for the pattern of the first area.

13. The image processing method according to claim 10, wherein
the predicted pattern is a graph that is created using a line that connects vertices to which gravity points of the areas are set, and
the calculating includes calculating the priority level by matching one vertex of the searched graph with a vertex of a graph of the target image when lengths of lines between corresponding graphs are different from each other.

14. The image processing method according to claim 9, wherein
the searching for the second area includes searching based on similarity between the second area and an average image of each the areas in the predicted pattern and one or more areas in the number of areas.

15. The image processing method according to claim 9, further comprising:
displaying the searched area with a format that is different from a format of the number of areas, and displaying the similarity for the searched area.

16. The image processing method according to claim 9, further comprising:
creating a graph indicating the predicted pattern and including a vertex as a gravity point of the area, a line that is a distance between the vertices and is less than a threshold value, an angle that is obtained by lines connected to the vertex, and a distance of the line.

17. A non-transitory computer readable storage medium configured to store a program causes a computer to execute a process, the process comprising:
obtaining a first area that is specified in a target image and an attribute that is assigned to the first area, the target image having a second area outside of the first area;

searching, with a processor, a storage for a pattern of the first area based on similarity between the pattern and a pattern created from a number of areas having the assigned attribute, the storage storing, for a plurality of areas in the target image, attributes and patterns associated with the attributes, each of the attributes being assigned to each the plurality of areas, and each of the patterns being created from areas having an identical attribute; and searching for the second area based on similarity between the second area and the number of areas in accordance with a predicted pattern identified based on the pattern of the first area resulting from the search of the storage, the predicted pattern including a geometric pattern of objects to which meta-data is assigned, and outputting, to a display device, a pattern identified based on the search for the second area.

* * * * *